(12) United States Patent
Chiang et al.

(10) Patent No.: US 9,572,306 B2
(45) Date of Patent: Feb. 21, 2017

(54) PLANTING BOX DEVICE

(71) Applicants: Yi-Cheng Chiang, New Taipei (TW); Hero Chen, San Gabriel, CA (US)

(72) Inventors: Yi-Cheng Chiang, New Taipei (TW); Hero Chen, San Gabriel, CA (US)

( * ) Notice: Subject to any disclaimer, the term of this patent is extended or adjusted under 35 U.S.C. 154(b) by 218 days.

(21) Appl. No.: 14/157,544

(22) Filed: Jan. 17, 2014

(65) Prior Publication Data

US 2015/0201563 A1 Jul. 23, 2015

(51) Int. Cl.
*A01G 9/02* (2006.01)
*A47G 7/04* (2006.01)

(52) U.S. Cl.
CPC .............. *A01G 9/022* (2013.01); *A01G 9/023* (2013.01); *A01G 9/028* (2013.01); *A47G 7/041* (2013.01)

(58) Field of Classification Search
CPC ........ A01G 9/028; A01G 9/022; A01G 9/023; A01G 9/104; A01G 27/02; A47F 7/0078; A47F 5/10; A47F 5/106; A47G 7/041; A47G 7/00; A47G 7/02; A47H 27/00; A47B 47/00; A47B 47/0066; A47B 47/0075; A47B 47/0083
USPC ..... 47/18, 19.1, 66.1, 66.2, 66.3, 83, 86, 39; 211/186, 188, 194, 88.03, 85.23; 220/4.28, 220/4.31, 4.33, 628, 630, 636, 638, 639, 640, 220/643, 691, 682, 683, 684
See application file for complete search history.

(56) References Cited

U.S. PATENT DOCUMENTS

| 3,759,598 | A | * | 9/1973 | Limberger | A47B 47/0083 108/158.13 |
|---|---|---|---|---|---|
| 3,774,576 | A | * | 11/1973 | Moore | A01K 1/03 119/480 |
| 3,955,863 | A | * | 5/1976 | Yellin | A47B 87/02 108/190 |
| 4,275,666 | A | * | 6/1981 | Schriever | A47B 87/0246 108/101 |
| 4,276,720 | A | * | 7/1981 | Lyon | A01G 27/04 47/14 |
| 4,768,845 | A | * | 9/1988 | Yeh | A47B 47/0008 312/257.1 |
| 4,901,473 | A | * | 2/1990 | Taule | A47B 47/05 108/159 |
| 5,433,326 | A | * | 7/1995 | Horian | A47B 47/00 211/188 |
| 5,452,681 | A | * | 9/1995 | Ho | A01K 31/08 119/461 |
| 5,642,830 | A | * | 7/1997 | Foster | B65D 7/24 220/4.28 |

(Continued)

*Primary Examiner* — Son T Nguyen
(74) *Attorney, Agent, or Firm* — Cheng-Ju Chiang

(57) ABSTRACT

The present invention provides a planting box device composed of at least a modular frame, which further comprises a frame set, a connecting rod group, wherein the frame set includes a first frame and a second frame; the first frame has a bearing plate, four corners of which are positioned by first openings and first posts and which also forms a plurality of positioning openings; the second frame having a sink forms second openings and second posts on its four corners, wherein the second posts are accommodated with the first openings in size and the sink has an inlet and an outlet; the connecting rod group comprises a plurality of connecting rods, each of which has rod openings and rod posts, so that the composition of the planting box device described above has function of structural expansion in horizontal and vertical direction and thus provides convenience in assembly and disassembly.

14 Claims, 15 Drawing Sheets

(56) References Cited

U.S. PATENT DOCUMENTS

| | | | | |
|---|---|---|---|---|
| 5,722,544 A * | 3/1998 | Williams | A47B 87/0246 | 108/107 |
| 5,826,375 A * | 10/1998 | Black | A01G 9/023 | 47/67 |
| 6,062,150 A * | 5/2000 | Sikora | A47B 87/0223 | 108/190 |
| 6,202,867 B1 * | 3/2001 | Di Blasi | A47B 47/0075 | 108/138 |
| 6,247,414 B1 * | 6/2001 | Sikora | A47B 87/0223 | 108/147.13 |
| 6,681,705 B2 * | 1/2004 | Wetterberg | A47B 57/40 | 108/107 |
| 6,752,278 B2 * | 6/2004 | Craft | A47B 81/00 | 211/14 |
| 8,245,443 B1 * | 8/2012 | Caruso | A01G 9/023 | 211/85.23 |
| 8,424,258 B2 * | 4/2013 | Modica | A01G 9/027 | 446/105 |
| 9,084,484 B2 * | 7/2015 | Vilkomirski | A47B 87/0215 | |
| 2003/0146180 A1 * | 8/2003 | Craft | A47B 87/0223 | 211/188 |
| 2004/0173552 A1 * | 9/2004 | Rowan | F16B 12/40 | 211/189 |
| 2005/0039391 A1 * | 2/2005 | Morse | A47G 7/041 | 47/39 |
| 2008/0053940 A1 * | 3/2008 | Whalen | A47B 47/045 | 211/134 |
| 2008/0155896 A1 * | 7/2008 | Chen | A01G 9/16 | 47/65.6 |
| 2008/0156759 A1 * | 7/2008 | Lai | A47B 87/0207 | 211/187 |
| 2009/0119987 A1 * | 5/2009 | Ingrassia | A01G 9/104 | 47/66.5 |
| 2009/0218341 A1 * | 9/2009 | Wu | B65F 1/06 | 220/4.28 |
| 2011/0036798 A1 * | 2/2011 | Chen | A47B 47/0008 | 211/188 |
| 2012/0174481 A1 * | 7/2012 | Toro | A01G 9/02 | 47/86 |
| 2013/0255149 A1 * | 10/2013 | Jung | A01G 9/045 | 47/39 |
| 2014/0190077 A1 * | 7/2014 | Burmann | A01G 9/02 | 47/66.1 |
| 2015/0047258 A1 * | 2/2015 | Lewis | A01G 9/023 | 47/66.6 |
| 2015/0158629 A1 * | 6/2015 | Harris | B65D 19/385 | 108/53.3 |

* cited by examiner

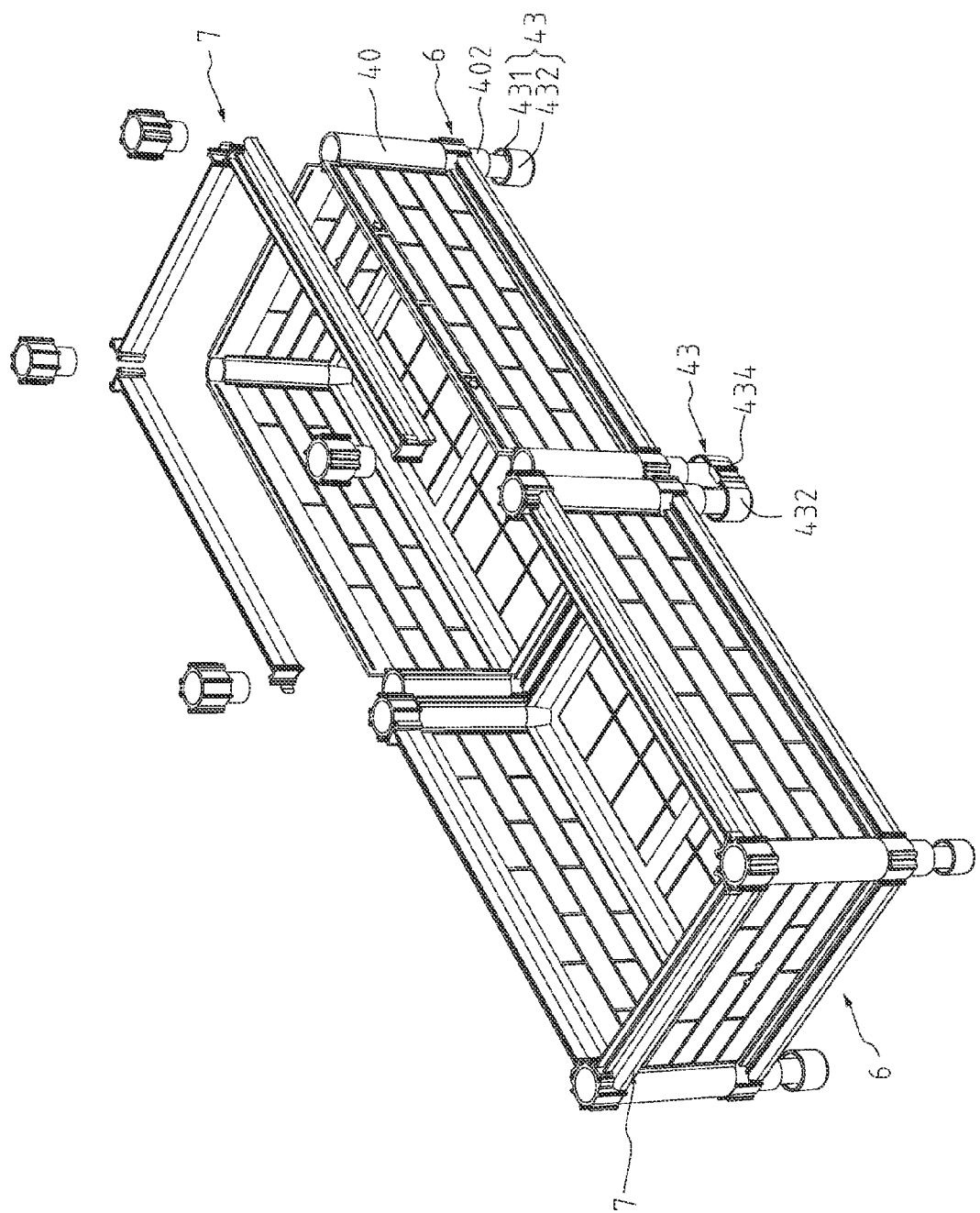

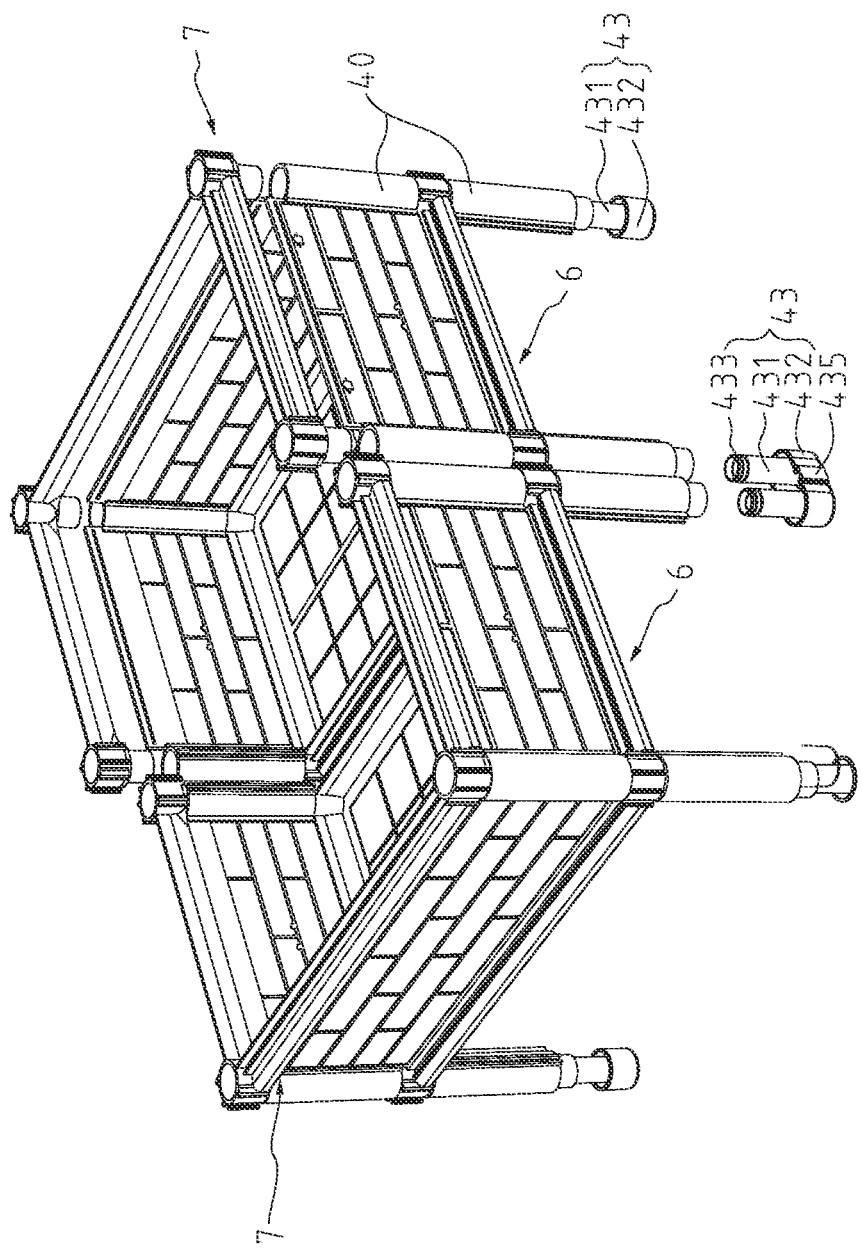

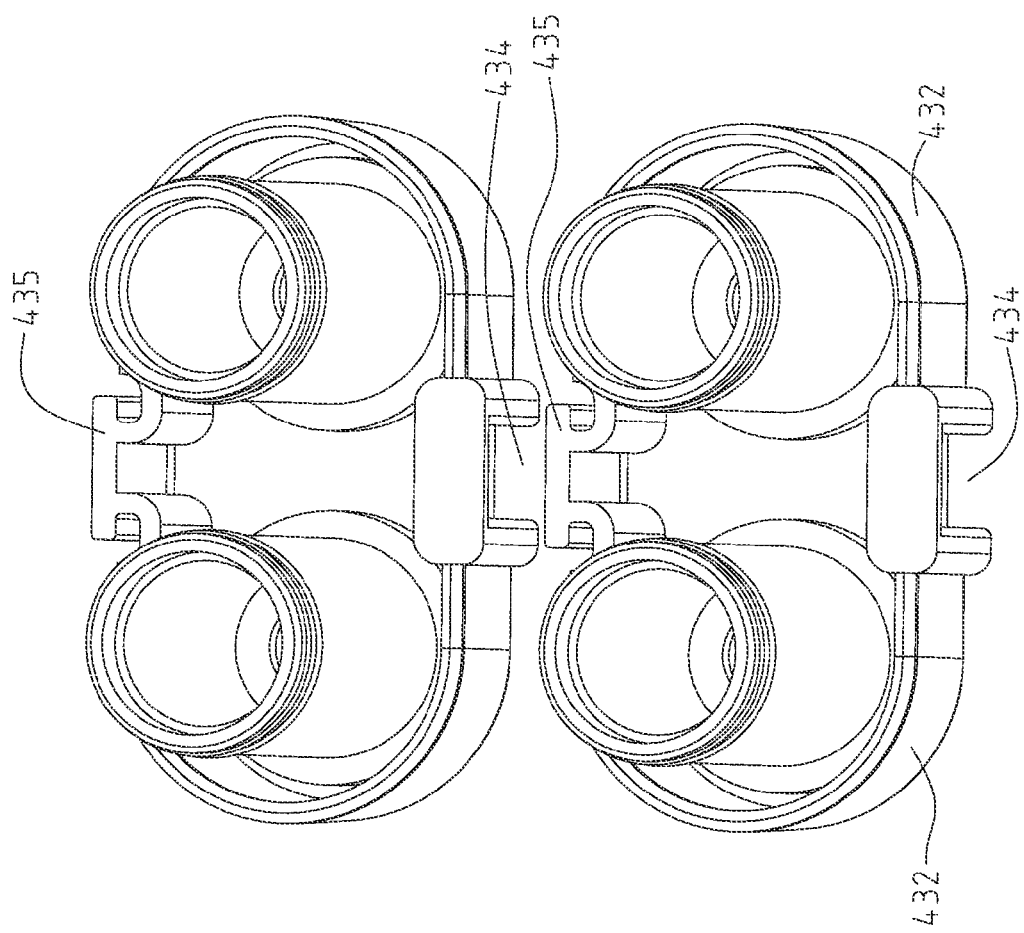

PLANTING BOX DEVICE

BACKGROUND OF THE INVENTION

1. Field of the Invention

The present invention relates to a planting box device, and more particularly to a multi-functional modular planting box device providing convenience in assembly and disassembly, and having function of drainage, ventilation and insect resistance.

2. The Related Art

With advances in science and technology, the felling of a large number of trees causes the thermal effect that makes the climate warming faster and thus worsens the living environment on the earth. If the ecological environmental protection idea fails to be fulfilled in human life, the ecological environment catastrophe would be inevitable; on the other hand, modern people with environmental awareness who may hope to plant trees, flowers or health vegetables & fruit in their leisure time in the hectic life, as a result, do not only strengthen the ecological system and green the environment, but also keep away from pesticide pollution to enjoy the self-sufficient life. There are many horticultural plant equipments on the market, such as cultivating slot, flower bed, shed frame, etc., however, there are still many problems that make them hard to meet the needs of the public. The reasons are as follows.

First, most of the cultivating slot, flower bed, shed frame, etc on the market are in direct contact with the ground thus for ants easy to climb from the ground and damage the cultivating plants; furthermore, it is inconvenient for users to squat down when planting because of the relatively low altitude of these equipments; second, the commonly used function of the cultivating slot, flower bed, shed frame, etc on the market are so monotonous that they can only be used for flower or vegetable planting, however, if a user changes mind to grow vines, it would be needed to purchase another dedicated shed frames, instead of directly changing the modeling by using a well-designed modular ventilative planting box; third, most of the cultivating slot, flower bed, shed frame, etc on the market have such a complex structure that both the assembly and disassembly usually takes a lot of time, and there is also a problem especially for users who are not able to assemble by themselves. Moreover, because of non-modular structure, those devices can not adjust their heights flexibly and expand their sizes to meet with the needs of users or the field size, and in result, they cause a lot of inconvenience to users. In addition, most of them are individual, hard to be used in large plant workshop, green wall/roof or agricultural planting/cultivating, so additional purchase is always needed.

SUMMARY OF THE INVENTION

Accordingly, an object of the present invention is to provide a planting box device which has simple structure and reasonable design to preferably provide convenience in assembly, disassembly, storage and transportation, and also have multi-function effects such as excellent drainage effect, ventilation effect and insect-resistant effect.

Another object of the present invention is to provide a planting box device having function of both water culture and fish culture, wherein the planting box provides sufficient nutrients from flowing water source used in water culture for the symbiosis of plant and fish to achieve multi-function effect.

Another object of the present invention is to provide a planting box device having function of horizontal and vertical expansion which is used in environmental compost bin due to the ventilation on each side, such that it can be either stacked by several single layers with size from small to large for the convenience in operation for household compost bin, or optionally expanded its volume to more than five hundred litters for use of large farm, wherein the bearing plate can replaced by movable door for ease of taking the decomposed manure to achieve simple and convenient effect.

To attain this, the planting box device is composed of at least a modular frame which comprises a frame set, a connecting rod group, wherein the frame set includes a first frame and a second frame; the first frame has a bearing plate, four corners of which are positioned by first openings and first posts and which also forms a plurality of positioning openings; the second frame having a sink forms second openings and second posts on its four corners, wherein the second posts are accommodated with the first openings in size while the first posts are accommodated with the second openings in size, and the sink has an inlet and an outlet; the connecting rod group comprises a plurality of connecting rods, each of which has rod openings and rod posts; wherein the rod openings can be attached to the first posts of the first frame or the second posts of the second frame and the rod posts can be attached to the openings of the first frame or the second openings of the second frame. The positioning openings of the bearing plate can be used to accommodate the planting pots and the sink with circulating water can thus be used to supply plant in the planting pots with water and culture fish.

In accordance with the present invention, each of the positioning openings is fit up with a cover; wherein the cover forms a central hole for the plant to pass therethrough and forms a track across the central hole for ease of opening the central hole to allow the plant to pass therethrough when assembled. Furthermore, a plurality of barbs and a plurality of positioning holes are arranged between the cover and the bearing plate to make the cover firmly arranged on the positioning openings. Moreover, the bearing plate forms at least a shore near the positioning openings on the bearing plate, so that after placing the planting pots into the positioning openings, one side of the cover can be raised to keep a certain distance with the bearing plate for ease of taking the planting pots out by hand.

In accordance with the present invention, the modular frame further comprises a plurality of sidings and the peripheral surfaces of each of the connecting rod forms lanes that provide the assembly of the sidings for the multidirectional expansion.

In accordance with the present invention, the peripheral surfaces of the first and second openings of the first and second frames respectively form arms and slots that can be secured to each other, by which other modular frames can be assembled by their arms and slots of their first and second frames for expansion in horizontal direction.

BRIEF DESCRIPTION OF THE DRAWINGS

FIGS. 7A-7D are assembled views according to the fourth to the seventh embodiments of the present invention in practical application;

FIG. 10 is a schematic view illustrating the assembling of the two pairs of pedestals;

DESCRIPTION OF THE PREFERRED EMBODIMENTS

Figure 1:
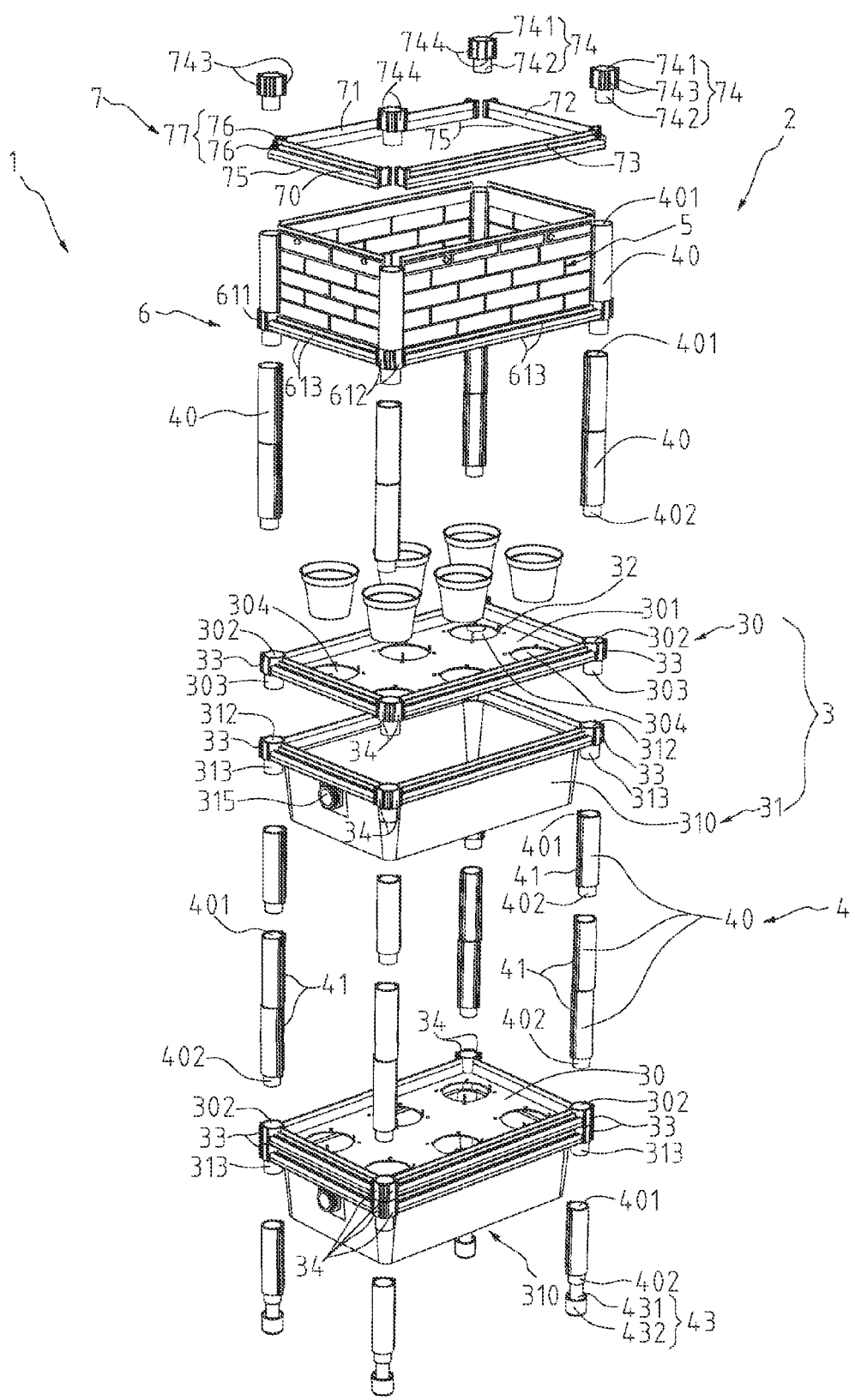
FIG. 1 is a perspective view of the planting box device according to the first embodiment of the present invention.
Figure 2:
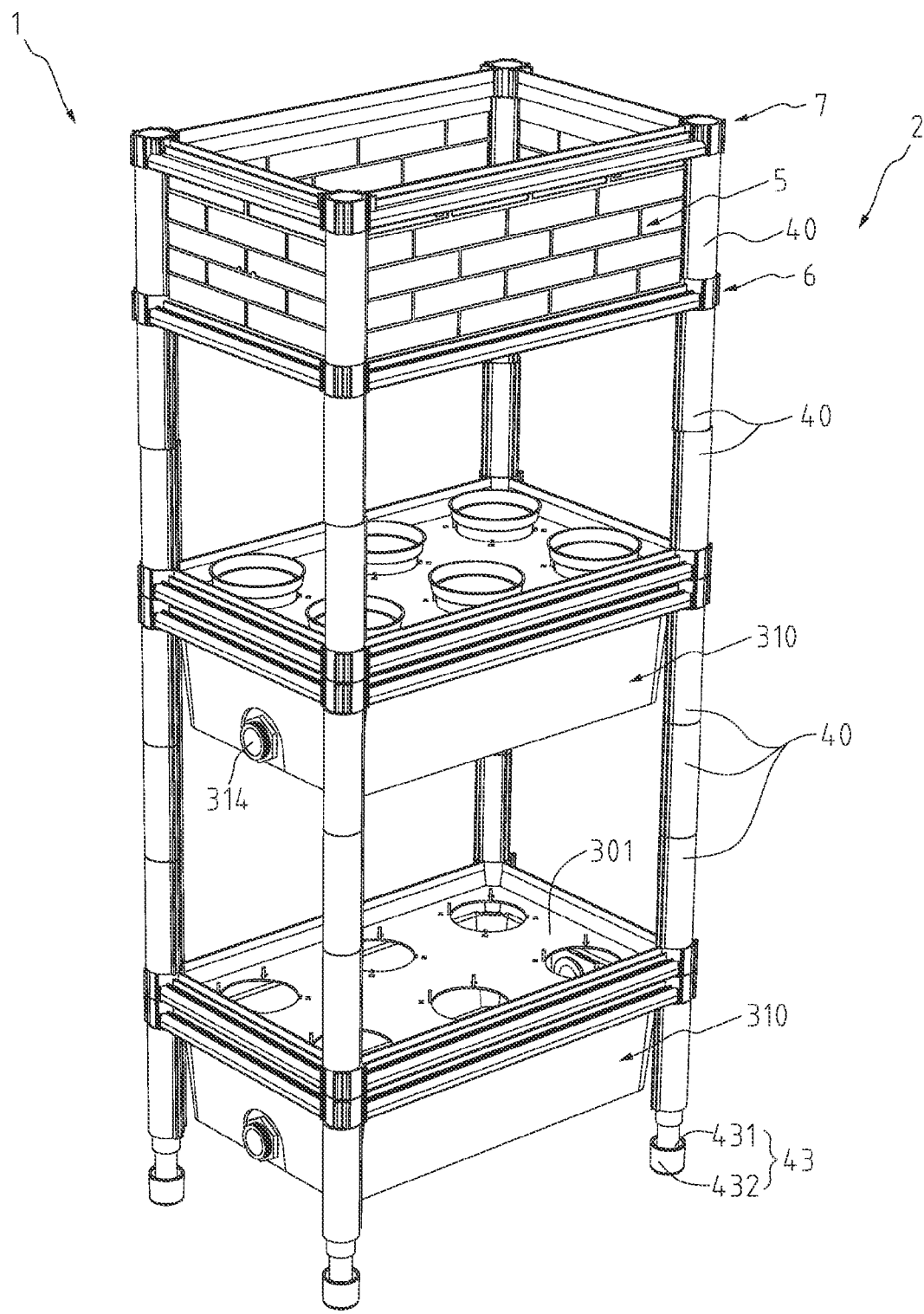
FIG. 2 is an assembled view illustrating FIG. 1 that is rotated 180 degrees.

Referring to FIG. 1 and FIG. 2, which are both the first embodiment of the present invention, a planting box device 1 is composed of at least a modular frame 2, which further comprises a frame set 3, a connecting rod group 4, a plurality of sidings 5, a base frame 6 and a movable frame 7; wherein the frame set 3 includes a first frame 30 and a second frame 31; the first frame 30 having a bearing plate 301 forms first openings 302 and first posts 303 on its four corners; the bearing plate 301 forms a plurality of positioning openings 304 thereon and each of the positioning openings 304 is fit up with a cover 305 (regarding to FIG. 8); wherein the cover 305 forms a central hole 306 for the plant to pass therethrough and forms a track 307 across the central hole 306 for ease of opening the central hole 306 to allow the plant to pass therethrough easily when assembled. Moreover, arranged between the cover 305 and the bearing plate 301 are a plurality of barbs 308 and a plurality of positioning holes 309 which are respectively formed on the cover 305 and the bearing plate 301 at an angle of 25 degrees; wherein the barbs 308 is defined by the length such that two of which are designed to be longer than the other two so as to make the cover 305 firmly arranged on the positioning openings 304 and prevent from collapse caused by strong wind; further, the bearing plate 301 forms at least a shore 32 near the positioning openings 304 on the bearing plate 301; the length of the two longer barbs 308 is equal to the length of the shore 32 so as to make the cover 305 properly cover the positioning openings 304 in harmony with the length of the shore 32. Therefore, after placing the planting pots into the positioning openings 304, one side of the cover 305 is raised to keep a certain distance from the bearing plate 301 for ease of taking the planting pot out by hand. The second frame 31 having a sink 310 (e.g., the sink is composed of transparent materials and placed horizontally) forms second openings 312 and second posts 313 on its four corners wherein the second posts 313 are accommodated with the first openings 302 in size; when assembled, the first posts 303 are attached to the second openings 312 and the second posts 313 are attached to the connecting rod group 4. In addition, the sink 310 has an inlet 314 and an outlet 315, characterized in that the inlet 314 is lower than the outlet 315, for the inflowing water able to mix therein before outflow in order to keep water and oxygen circulating in the sink 310 to provide the survival and symbiosis of both plant and fish. Besides, the peripheral surfaces of the first and second openings 302, 312 adjacent to the first and second frames 30, 31 respectively form arms 33 and slots 34 that are secured to each other, by which other modular frames 8 can be assembled by their arms 83 and slots 84 of their first and second frames for expansion in horizontal direction (referring to FIG. 9A, 9B) in purpose of providing plant factory with convenience and massive use.

Figure 7B:
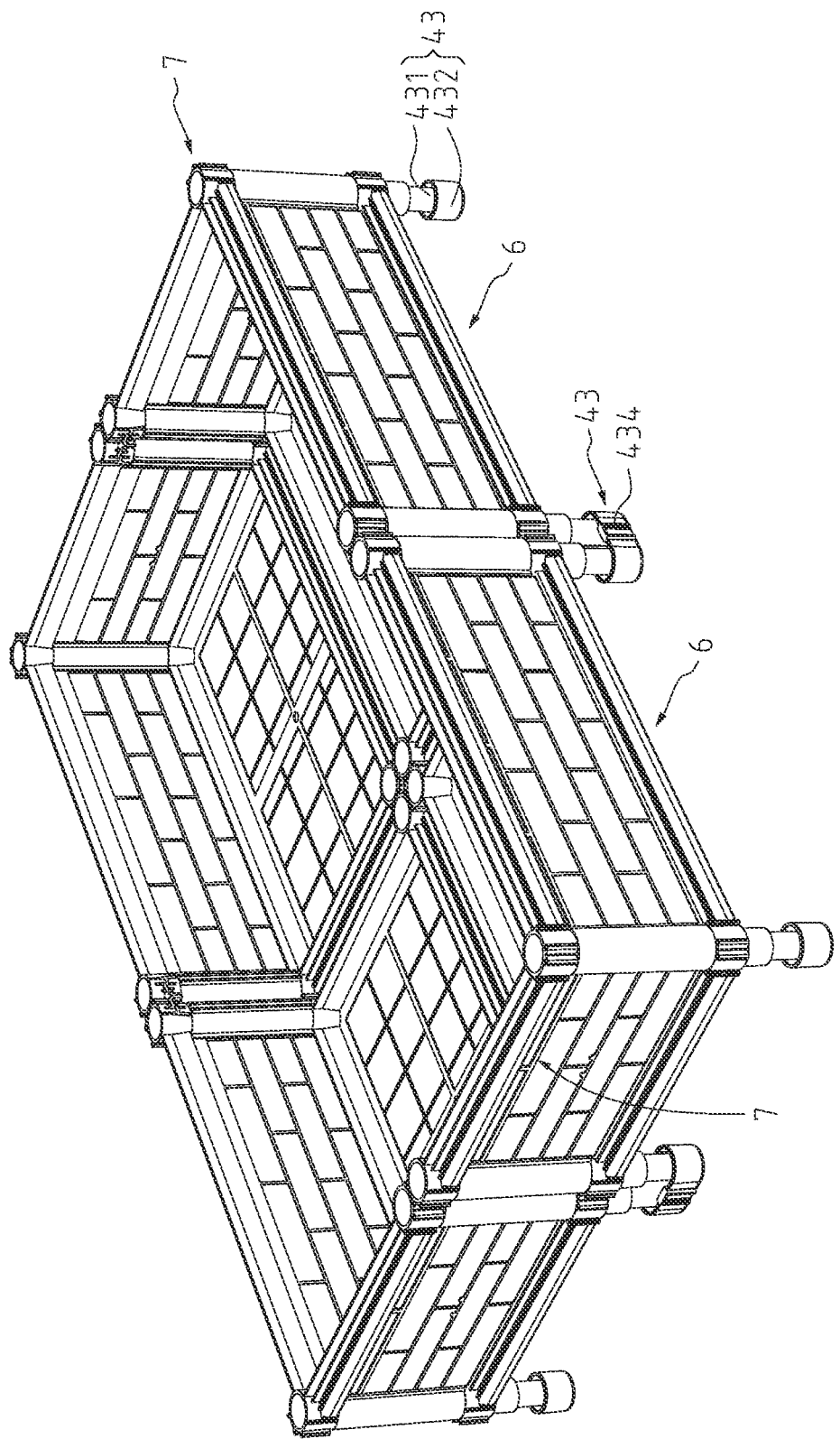
Figure 7D:
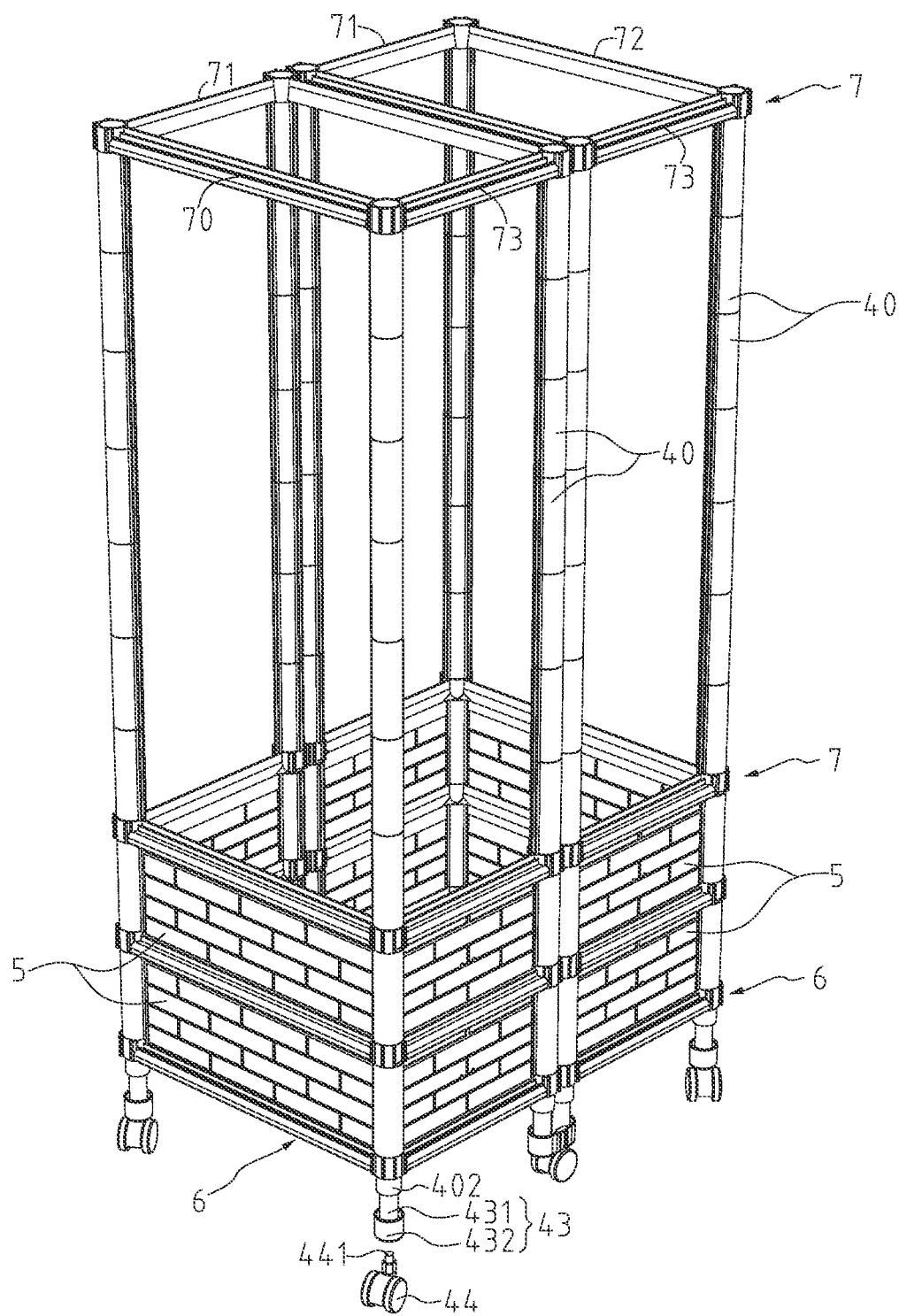

The connecting rod group 4 comprises a plurality of connecting rods 40, e.g., three connecting rods 40 stacked vertically in this embodiment; each group of connecting rods 40 has rod openings 401 and rod posts 402; wherein the rod openings 401 are attached to the second posts 313 of the second frame 31, while the rod posts 402 are attached to the openings 302 of the first frame 30. Furthermore, the peripheral surfaces of each of the connecting rods 40 form lanes 41 to provide the assembly of the sidings 5 for the vertical expansion, e.g., the sidings 5 are positioned between the base frame 6 and the movable frame 7 in this embodiment. The connecting rod group 4 further comprises caps 42 (referring to FIG. 5), socks 43 and wheels 44 (referring to FIG. 7D); the caps 42 have pivots 421 attached to the first openings 302 on the very top, the second openings 312 and junctions 74, e.g., openings 741 of the junctions 74 in this embodiment, and also, the peripheral surface of the caps 42 are attached to anti-slip strips 422; the socks 43 (referring to FIG. 5) has inner posts 431 and pedestals 432; wherein the inner post 431 forms thread 433 to be screw connected to first posts 303 on the very bottom, second post 313 and rod posts 402; the pedestals 432 are used for filled with water to prevent ants from creeping up and destroying plants. In order to be assembled firmly when expanding, referring to FIG. 10, the socks 43 can also combine one another, i.e., two in one formation after combination, and the sides relative to the pedestals 432 form concaves 434 and convexes 435, both of which are secured to each other; the wheels 44 having shafts 441 with the reinforced and antirust steel bars enveloped therein are positioned on the pedestals 432 of the socks 43.

Figure 5:
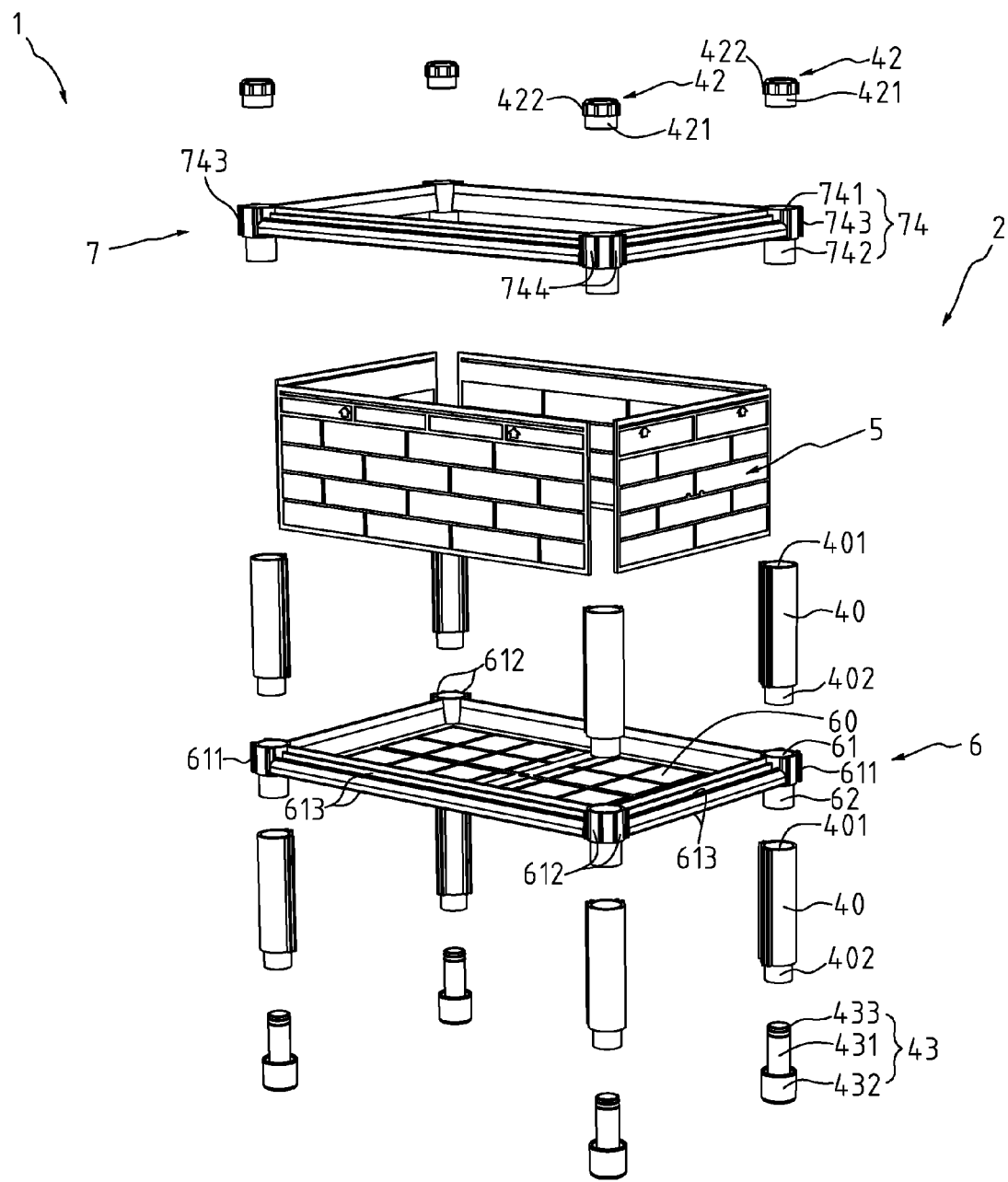
FIG. 5 is a perspective view according to the third embodiment of the present invention.

Referring to FIG. 5, the base frame 6 positioned beneath the sidings 5 is a square frame with a base 60; the four corners of the square frame are attached to connecting openings 61 and connecting posts 62; and positioned on the peripheral surfaces of the connecting openings 61 are arms 611 and slots 612 same as the arms 33 and the slots 34 of the first and second frame 30, 31 and upper and lower surfaces of each side of the square frame forms lanes 613 same as the lanes 41 of the connecting rods 40, so that the lanes 613 are used for assembling the sidings 5, the connecting openings 61 and the connecting posts 62 are used for the vertical assembly of the connecting rods 40, and the arms 611 and the slots 612 are used for the horizontal expansion from the first and second frames 31, 32.

The movable frame 7 is composed of four frame rods 70, 71, 72, 73 and four junctions 74; the four frame rods 70, 71, 72, 73 can either be equal in length to appear as a square frame after assembled, or be unequal in length as a rectangular frame after assembled, e.g. two frame rods longer than the other two as a rectangular frame after assembled in this embodiment; the lower peripheral surfaces of each of the frame rods form lanes 75 same as the connecting rods 40 (two frame rods vertically assembled in this embodiment), and two ends of each frame rod forms arms 76 so that arms 76 of the adjacent two frame rods 70/71 (71/72, 72/73, 73/70) together form slots 77 same as the slots 34 of the first and second frames 30,31; each of the junctions 74 has the first and second openings 302, 312 of the first and second frames 30, 31 and the opening 741 and the post 742 same as the first and second posts 303, 313. On the adjacent peripheral surfaces relative to the opening ends, the junctions 74 form the arms 743, same as the arms 33 of the first and second frames 30, 31, and form slots 744, same as the slots 34 of the first and second frames 30, 31, so that the assembly of the intact frame is reached by the connection between the arms 743 of the junctions 74 and the arms 76 of the adjacent two frame rods 70/71 (71/72, 72/73, 73/70); the intact frame is assembled vertically by use of the junctions 74 and the connecting rods 40, and the first and second frame 30, 31 are expanded horizontally by use of the arms 743 and the slots 744.

Figure 3:
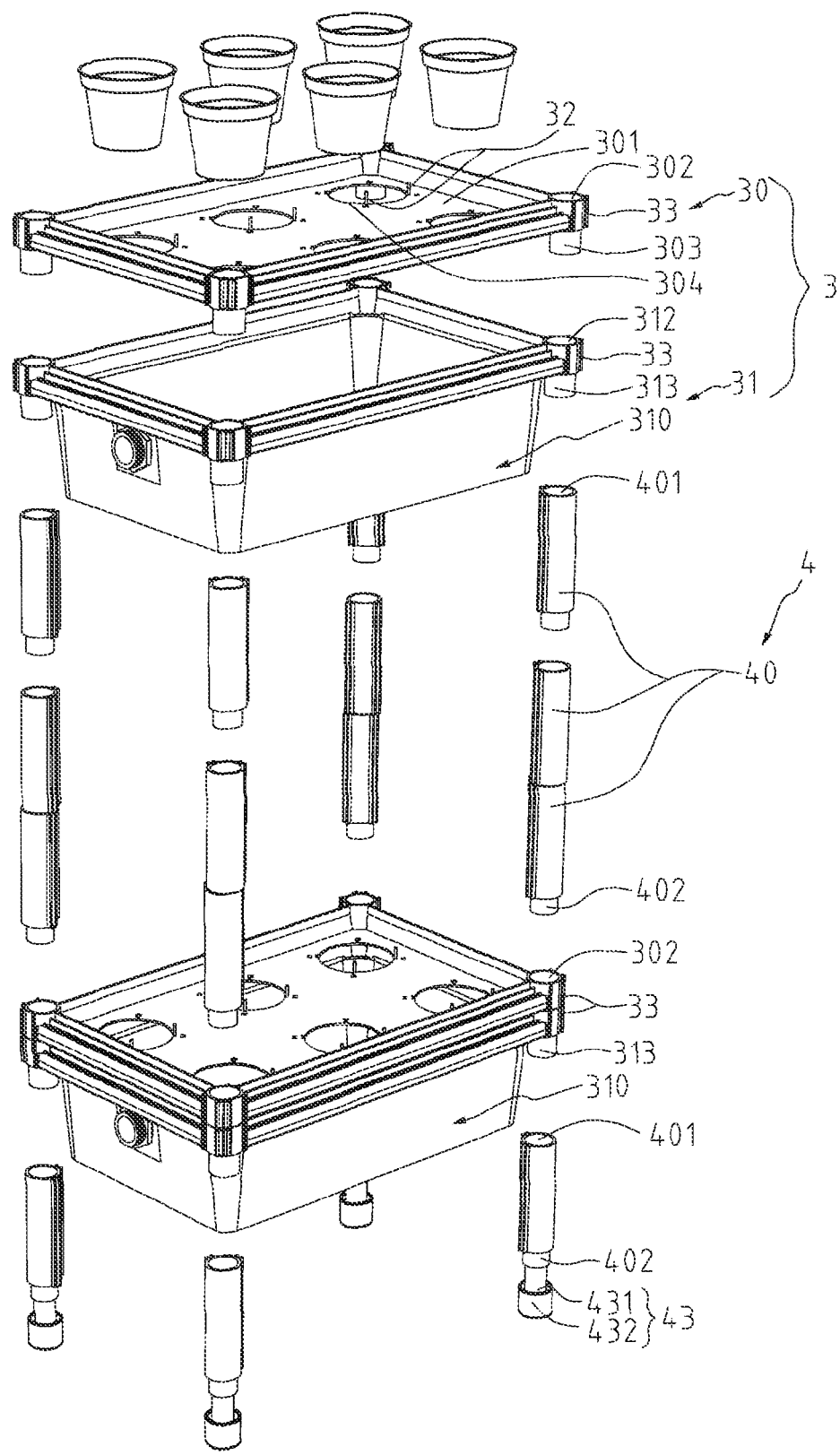
FIG. 3 is a perspective view according to the second embodiment of the present invention.
Figure 4:
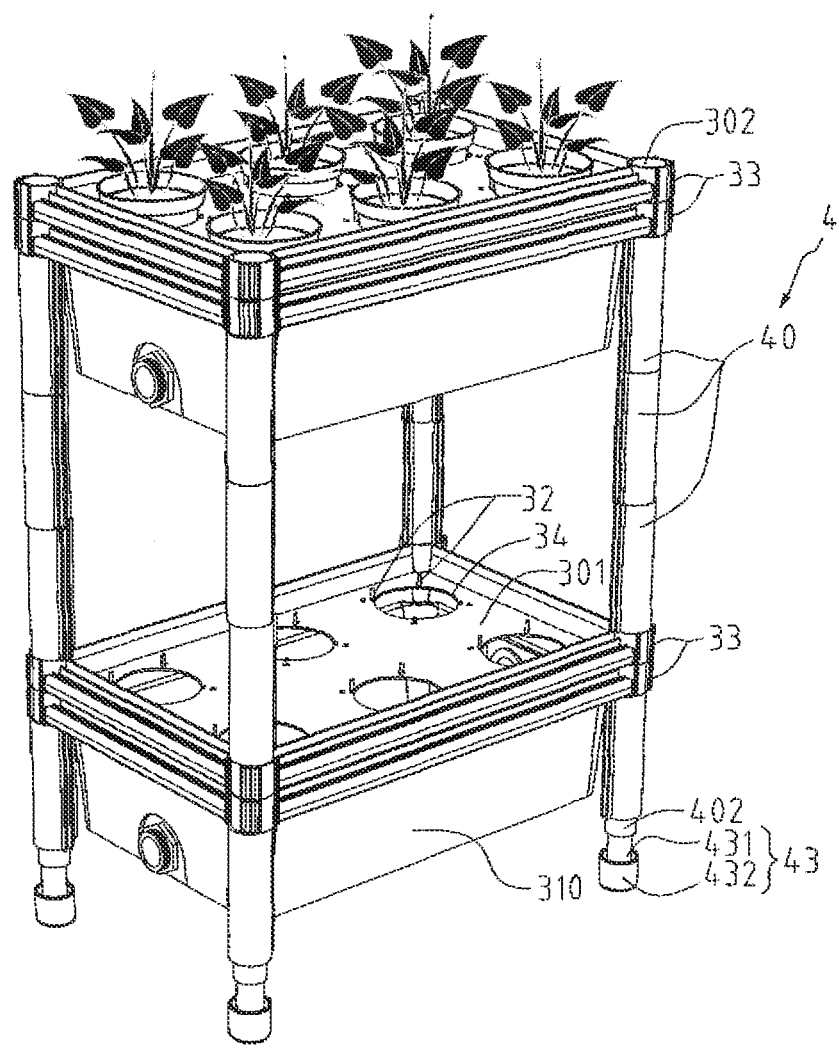
FIG. 4 is an assembled view illustrating the second embodiment of the present invention in practical application.
Figure 6:
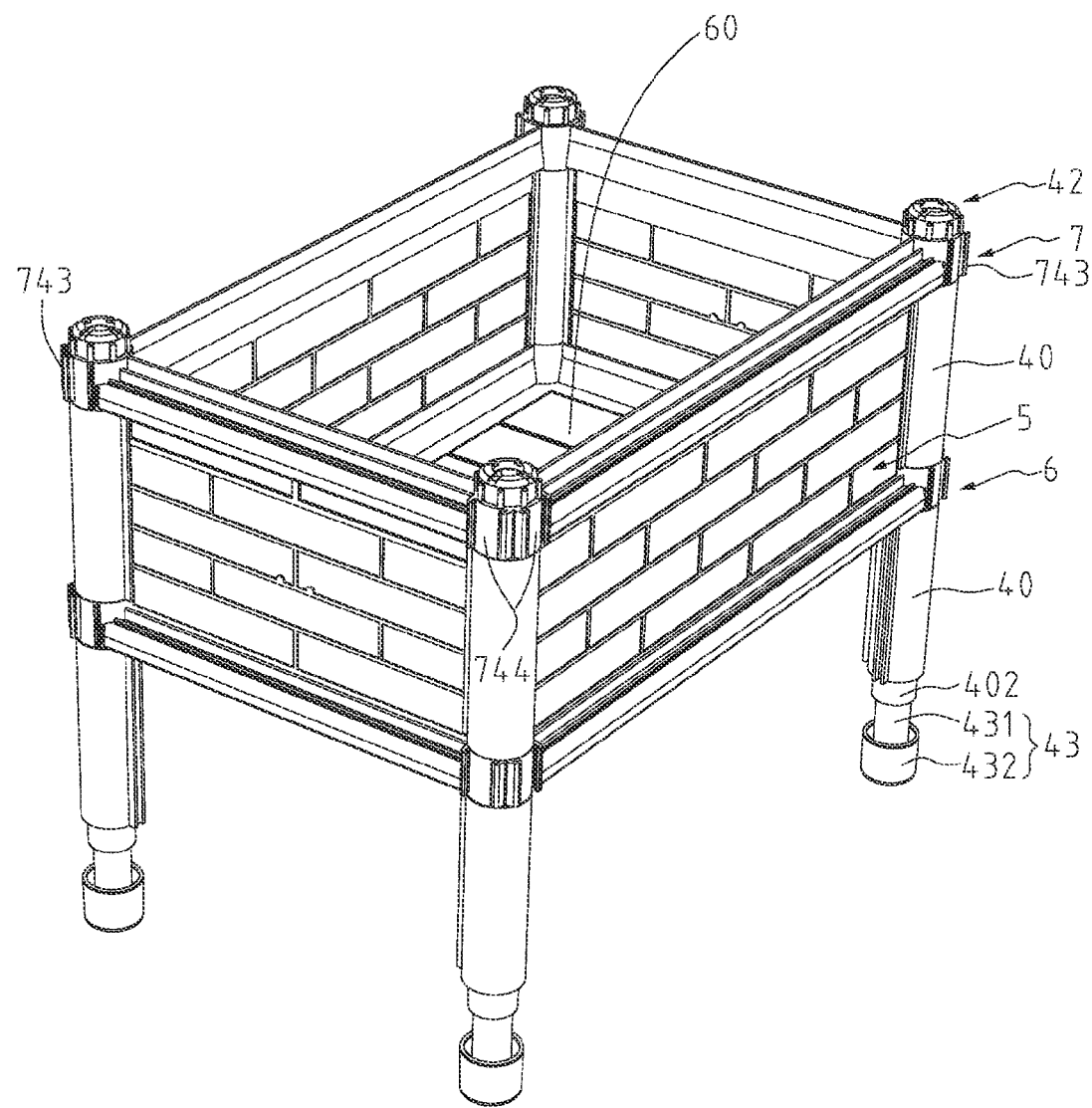
FIG. 6 is an assembled view according to FIG. 5.

Referring to FIG. 3, FIG. 4 as the second embodiment of the planting box device, as shown, the second embodiment is different from the first embodiment such that the second embodiment omits the base frame 6, the movable frame 7 and the several connecting rods 40 and thus provides a planting box device capable of culturing fish and planting plant. Analogously, referring to FIG. 5, FIG. 6 as the third embodiment of the planting box device, as shown, the third embodiment is different from the first embodiment such that the third embodiment independently assembles the base frame 6, the movable frame 7 and the several connecting rods 40 and thus provides a planting box device capable of planting plant.

Figure 11:
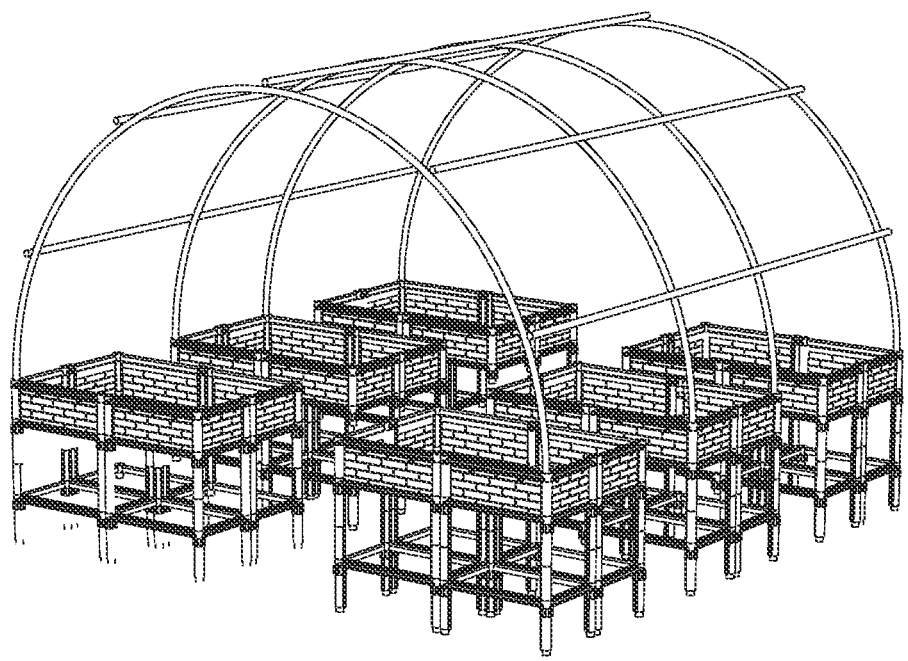
FIG. 11 is a perspective view according to the ninth embodiment of the present invention.
Figure 12:
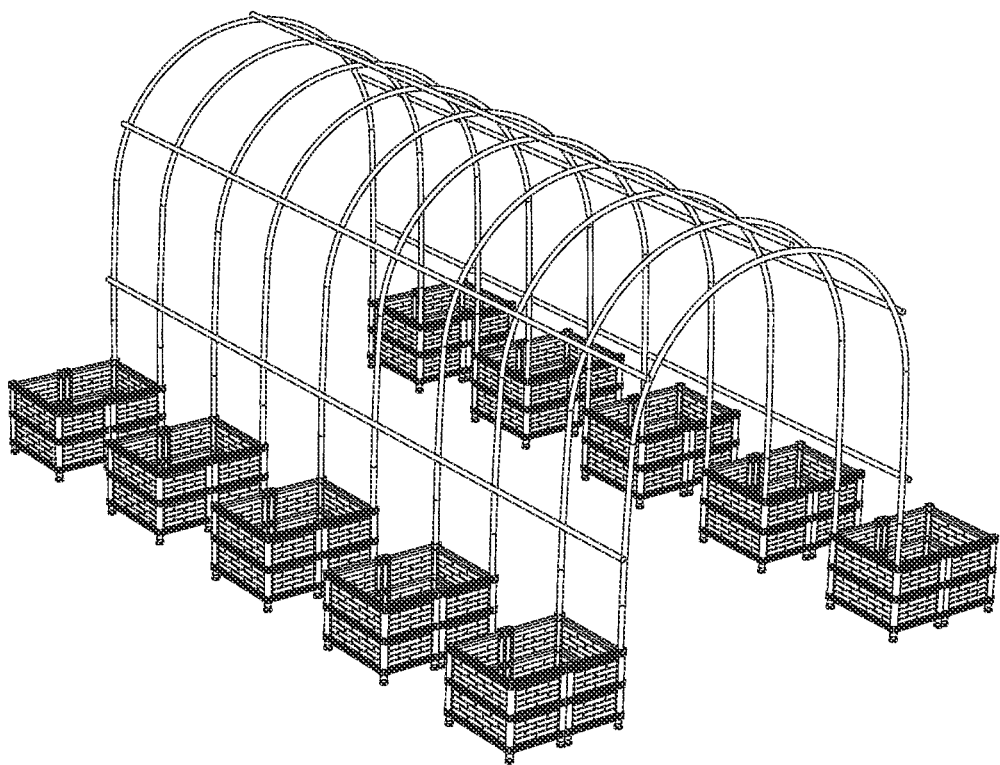
FIG. 12 is a perspective view according to the tenth embodiment of the present invention.
Figure 13:
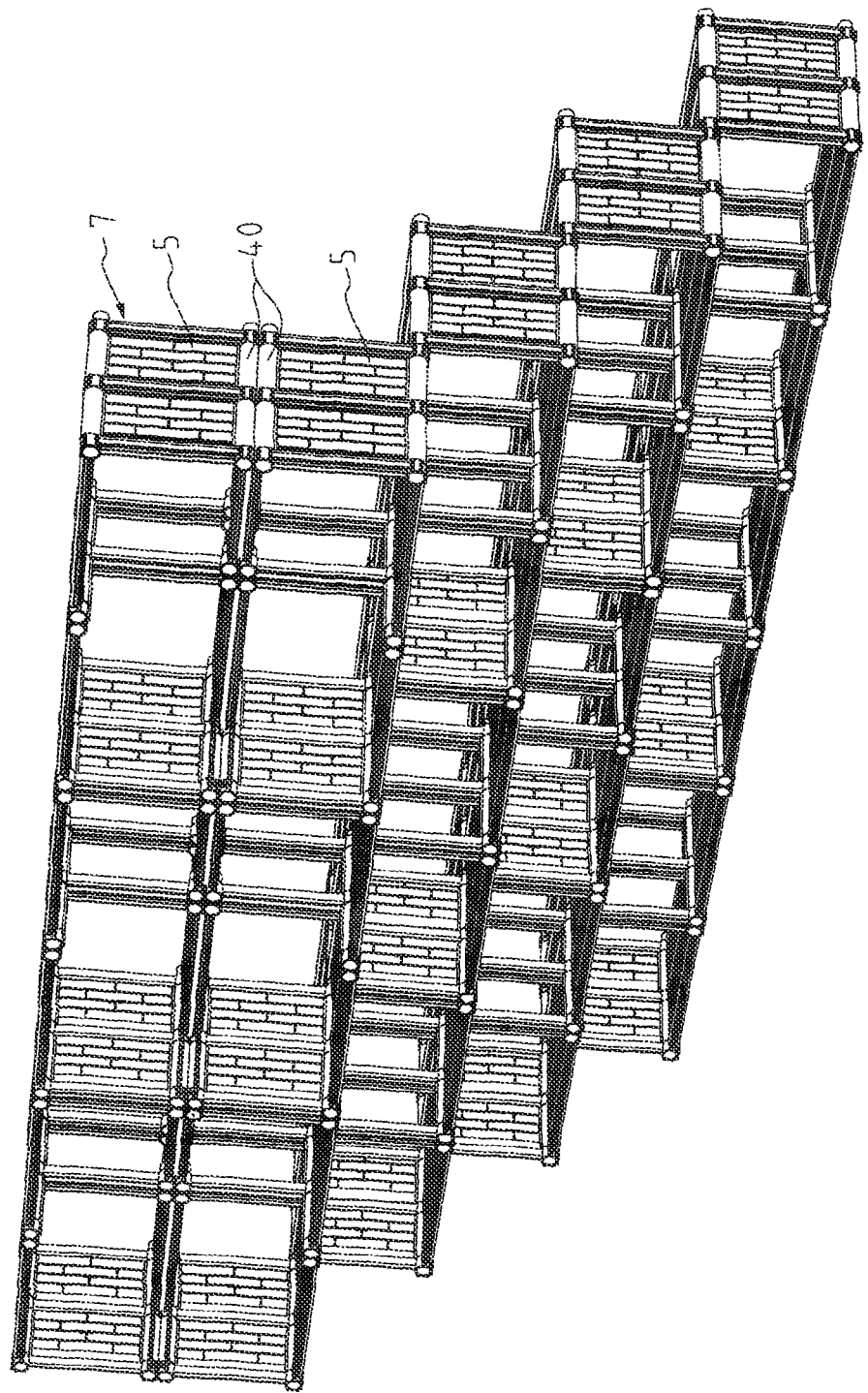
FIG. 13 is a perspective view according to the eleventh embodiment of the present invention.

Besides, please further referring to FIGS. 7A to 7D as the fourth to seventh embodiments of the present invention, the present invention assembles the movable frame 7 composed of four long of and two short of the frame rods (70, 71, 72, 73) thereof for assembling and expanding horizontally by use of the base frame 6, the movable frame 7, the several connecting rods 40, the two-in-one socks 43 and so on (FIG. 7A); or the present invention assembles the movable frame 7 composed of four long of and four short of the frame rods (70, 71, 72, 73) thereof for assembling and expanding horizontally (FIG. 7B), wherein, shown in FIG. 10, after the connection between the two-in-one socks, one or two pairs of the pedestal need only a wheel positioned thereon; or the present invention assembles with two long of and four short of the frame rods (70, 71, 72, 73) thereof for assembling and expanding horizontally (FIG. 7C); or the present invention assembles the two assembly-stacked modular frame 2 composed of two long of and two short of the frame rods (70, 71, 72, 73) as a whole by use of the two-in-one socks (FIG. 7D), so as to preferably provide convenience in assembly, disassembly, storage and transportation, and also have excellent drainage and ventilation effect and further have insect-resistant effect after covering insect proof nets and other multi-function effects. Furthermore, referring to FIG. 11 and FIG. 12 as perspective views of the ninth and tenth embodiment of the planting box device 1, as shown in the ninth embodiment, the planting box device 1 of the present invention can be freely raised in height to match the assembly of shed frames and the connecting rod 40 for people, especially for old people who can work on planting in an appropriate height with no need of bending. In addition, the shed frames can be covered by net for protection against insects, just like cultivation under net house, and also can be added a layer of plastic cloth for sheltering from the rain in harmony with plastic pipe on sale in the market; the tenth embodiment shows that the planting box device 1 of the present invention is covered by plastic cloth and placed on both sides to form a green tunnel as an assembly pattern. Please referring to FIG. 13 as a perspective view of the eleventh embodiment, the embodiment omits the base frame 6 and assembles the step-like planting box by only use of the movable frames 7, several connecting rods 40 and sidings 5; it can be applied to aeration and drainage around the periphery of the hillsides and also can allow plants to take root without the base frame 6, thus it is the best ecological engineering method for the soil and water conservation.

Figure 8:
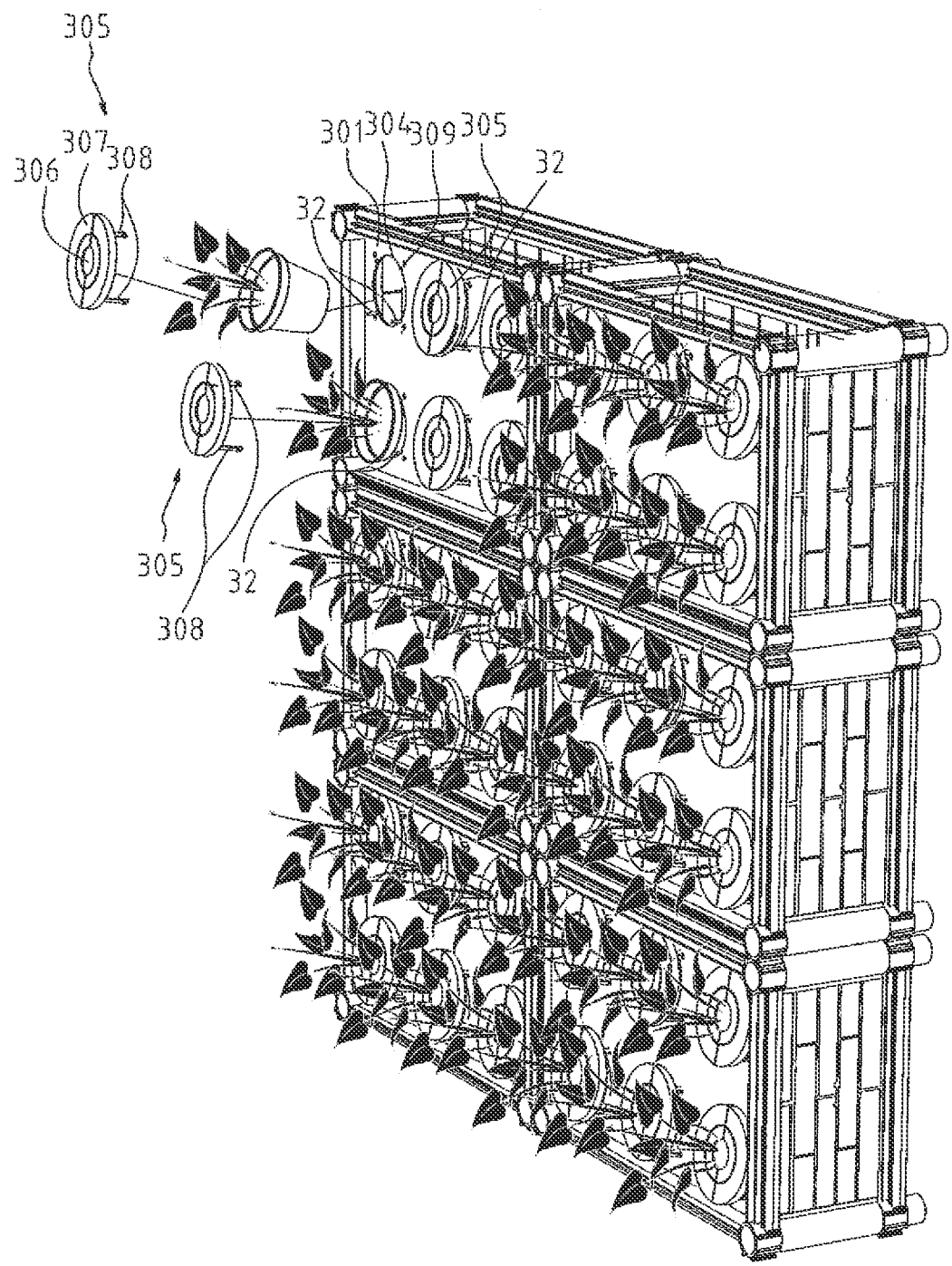
FIG. 8 is a perspective view according to the eighth embodiment of the present invention.
Figure 9A:
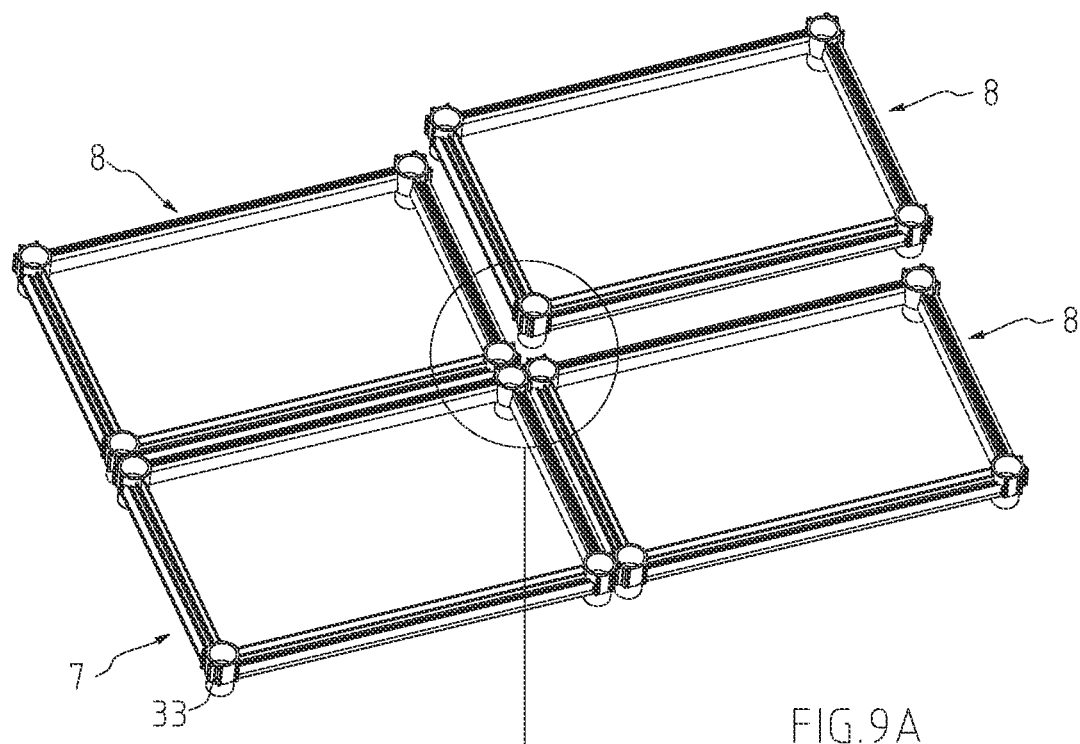
FIG. 9A is a perspective view illustrating slots joined by arms between the first and second frames for expansion in horizontal direction.
Figure 9B:
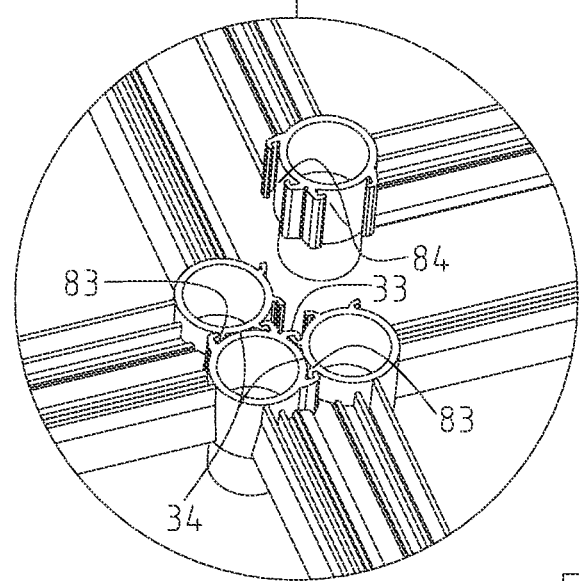
FIG. 9B is a partial enlarged view according to FIG. 9A.

Please referring to FIG. 8 as a perspective view of the eighth embodiment of the present invention, the embodiment applies to green wall, the present invention refers to a widespread planting device composed of the base frame 6, the movable frame 7 and the several connecting rods 40, wherein each planting pot is covered by the cover 305; when the cover 305 is assembled, the track 307 is designed for ease of opening the central hole 306 to allow plant to pass therethrough easily when assembled in order to prevent from collapse caused by strong wind. And the length of the two longer barbs 308 matches up with the length of the shore 32 to make the cover 305 properly cover on the positioning openings 304, so that after placing the planting pot into the positioning openings 304, one side of the cover 305 is raised to keep a certain distance from the bearing plate 301 for ease of taking the planting pot out by hand; besides, medium can be added into the base frame 6 and the movable frame 7 to preserve water and nutrient for plant to grow healthily. Furthermore, holes (the connecting rod 40) on the four corners of the assembled boxes of the present invention are positioned on the wall or net rack for the greening effect.

It is understood that the invention may be embodied in other forms within the scope of the claims. Thus the present examples and embodiments are to be considered in all respects as illustrative, and not restrictive, of the invention defined by the claims.

What is claimed is:

1. A planting box device comprising at least a modular frame, the modular frame comprising:
   a base frame having four corners and four sides, each of the four corners of the base frame forming a first opening and a first post, a first arm and a first slot being positioned on an outer peripheral wall of the first opening, each of the four sides with respect to an supper surface of the base frame being recessed inward to form a first lane;
   a movable frame being composed of four junctions corresponding to the four corners of the base frame and four frame rods corresponding to the four sides of the base frame, each of the four junctions forming a second opening and a second post, a second arm and a second slot being positioned on an outer peripheral wall of the second opening, each of the four frame rods with respect to a lower surface of the movable frame being recessed inward to form a second lane;
   a plurality of sidings each being vertically secured into the first lane of the base frame and the second lane of the moveable frame;
   a connecting rod group comprising a plurality of first connecting rods, each of the first connecting rods being connected between each two of the sidings and forming a third opening and a third post, the third opening receiving the second post of the movable frame, the third post inserting in the first opening of the base frame; and
   a bearing plate being connected with the four frame rods of the movable frame and having a plurality of positioning openings for entering a planting pot therethrough, each of the positioning openings being fit up with a cover, the cover being mounted with a central hole for a plant of the planting pot to pass therethrough, the cover further being mounted with a track, the track being across the central hole so as to provide convenience in opening the central hole for the plant to pass therethrough;

wherein when there are more than one modular frame in assembly, the first arm and the first slot of the base frame and the second arm and the second slot of the movable frame are cooperatively utilized to connect among modular frames of the planting box device.

2. The planting box device of claim 1, further comprising a frame set, wherein the frame set includes a first frame and a second frame, the first frame having a bearing plate, four corners of the bearing plate being positioned by first openings and first posts, the bearing plate also forming a plurality of positioning openings.

3. The planting box device of claim 2, wherein each of the positioning openings is fit up with a cover; wherein the cover forms a central hole for the plant to pass therethrough and forms a track across the central hole for ease of opening the central hole to allow the plant to pass therethrough when assembled.

4. The planting box device of claim 3, wherein the bearing plate forms at least a shore near the positioning openings on the bearing plate, so that after placing the planting pot into the positioning openings, one side of the cover is raised to keep a certain distance from the bearing plate for ease of taking the planting pot out by hand.

5. The planting box device of claim 4, wherein arranged between the cover and the bearing plate are a plurality of barbs and a plurality of positioning holes which are respectively formed on the cover and the bearing plate at an angle of 25 degrees; wherein the barbs are defined such that two of which are designed to be longer than the other two and that the length of the two longer barbs is equal to the length of the shore so as to make the cover firmly arranged on the positioning openings.

6. The planting box device of claim 2, wherein the rod openings are attached to the first posts of the first frame or the second posts of the second frame and the rod posts are attached to the first openings of the first frame or the second openings of the second frame.

7. The planting box device of claim 6, wherein the peripheral surface of each of the connecting rods forms lanes to provide the assembly of the sidings for structural expansion in vertical direction; and the peripheral surface of the first and second openings of the first and second frames respectively forms arms and slots that are secured to each other, by which other modular frames can be assembled by their arms and slots of their first and second frames for expansion in a horizontal direction.

8. The planting box device of claim 7, wherein the connecting rod group further comprises caps, socks and wheels; the caps has pivots attached to the first openings on the very top/the second openings/junctions, and also the peripheral surface of the caps are attached to anti-slip strips; the socks has inner posts and pedestals;

wherein the inner post forms thread to be screw connected to first posts on the very bottom/second post/rod post; the wheels having with the reinforced and antirust steel bar enveloped therein are positioned on the pedestals of the socks.

9. The planting box device of claim 8, wherein the socks can also combine one another as two-in-one formation after combination, and the sides relative to the pedestals form concaves and convexes that are assembled firmly when expanding.

10. The planting box device of claim 1, wherein the bearing plate forms at least a shore near the positioning openings, so that after placing the planting pot into the positioning openings, one side of the cover is raised to keep a certain distance from the bearing plate for ease of taking the planting pot out by hand.

11. The planting box device of claim 10, wherein a plurality of barbs and a plurality of positioning holes are located between the cover and the bearing plate and are respectively formed on the cover and the bearing plate at an angle of 25 degrees, wherein there are four barbs, two of the four barbs being designed to be longer than the other two, and the length of the longer two barbs being equal to the length of the shore so as to make the cover firmly arranged on the positioning openings.

12. The planting box device of claim 1, wherein a peripheral surface of each of the first connecting rods forms a third lane to provide each of the sidings to be secured therein.

13. The planting box device of claim 12, wherein the connecting rod group further comprises a plurality of second connecting rods, caps, socks and wheels, each of the second connecting rods forming a fourth opening and a fourth post, the fourth opening receiving the first post of the base frame, the fourth post inserting in each of the socks, each of the caps being defined with a pivot and an anti-slip strip, the pivot being inserted in the second opening of the movable frame, the anti-slip strip being formed on a peripheral surface of each of the cap for ease of rotating the cap by hands, each of the socks being defined with an inner post and a pedestal, the inner post forming a thread to provide a screwed connection to the fourth post of each of the second connecting rods, each of the wheels being positioned on the pedestal of each of the socks wherein a reinforced and antirust steel bar enveloped is enveloped in each of the wheels, a peripheral surface of each of the second connecting rods forming a four lane and each of the four sides with respect to a lower surface of the base frame being recessed inward to form a fifth lane, the fourth lane and the fifth lane cooperatively providing a positioning of the sidings.

14. The planting box device of claim 13, wherein each two adjacent socks are combined as one sock and the sides of the one sock form concaves and convexes with respect to sides of the pedestals for firmness after assembly.

* * * * *